United States Patent [19]
Polk et al.

[11] Patent Number: 4,480,938
[45] Date of Patent: Nov. 6, 1984

[54] PRINTER ESCAPEMENT SERVOMOTOR DRIVE WITH A MINIMUM POWER SUPPLY

[75] Inventors: Darryl R. Polk; Richard A. Southworth, both of Austin, Tex.

[73] Assignee: International Business Machines Corporation, Armonk, N.Y.

[21] Appl. No.: 410,279

[22] Filed: Aug. 23, 1982

[51] Int. Cl.³ .................................................. B41J 19/00
[52] U.S. Cl. ...................................... 400/322; 400/320; 318/571; 318/684; 318/685
[58] Field of Search ............... 400/320, 322, 903; 307/149; 318/259, 260, 270, 271, 342, 345 B, 345 F, 410, 560, 570, 571, 635, 684, 685, 696; 361/154

[56] References Cited

U.S. PATENT DOCUMENTS

| | | | |
|---|---|---|---|
| 2,409,312 | 10/1946 | Reeves | 318/260 X |
| 3,204,132 | 8/1965 | Benaglio et al. | 307/149 |
| 3,617,715 | 11/1971 | Dummermuth | 318/571 X |
| 3,628,102 | 12/1971 | Jauch et al. | 361/154 |
| 3,670,861 | 6/1972 | Zenner et al. | 400/903 X |
| 3,716,770 | 2/1973 | Habisohn | 318/259 |
| 3,845,379 | 10/1974 | Kawamata et al. | 318/345 F |
| 3,919,608 | 11/1975 | Usami et al. | 318/696 X |
| 4,072,888 | 2/1978 | Bechtle et al. | 318/685 |
| 4,107,593 | 8/1978 | Anderson | 318/685 |
| 4,127,801 | 11/1978 | Leenhouts | 318/696 |
| 4,208,868 | 6/1980 | Regnier et al. | 318/696 X |
| 4,226,546 | 10/1980 | Hoffman | 318/571 X |
| 4,254,371 | 3/1981 | Scholten | 318/685 |
| 4,318,625 | 3/1982 | Survant | 400/322 |
| 4,358,725 | 11/1982 | Brendemuehl | 318/685 X |

FOREIGN PATENT DOCUMENTS

| | | |
|---|---|---|
| 2723300 | 12/1977 | Fed. Rep. of Germany. |
| 2953307 | 1/1981 | Fed. Rep. of Germany. |
| 2415900 | 8/1979 | France. |

OTHER PUBLICATIONS

IBM Technical Disclosure Bulletin, "Current Tracking Chopper Motor Driver", Crider et al., vol. 23, No. 4, Sep. 1980, pp. 1303-1304.

"The Stepping Motor Handbook", published by Sigma Instruments, Inc., Braintree, Mass., United States, 1972, pp. i-iv, 26-29, 34-37, 42, 43.

Primary Examiner—Ernest T. Wright, Jr.
Attorney, Agent, or Firm—J. B. Kraft

[57] ABSTRACT

A servomotor drive system for a printer escapement is provided which minimizes power supply requirements. The drive system has means for accelerating and decelerating the printhead escapement having a fixed current source applied to a servomotor which drives the escapement. In order to minimize power requirements, the system includes means for controlling the current in the motor which comprise means for sensing the actual motor current and feeding back the sensed current to a comparing means. A preselected varying current profile is applied to the comparing means which compares this profile to the actual motor current. Means are then provided responsive to these comparing means for altering the actual motor current to conform with this preselected varying motor current profile.

6 Claims, 7 Drawing Figures

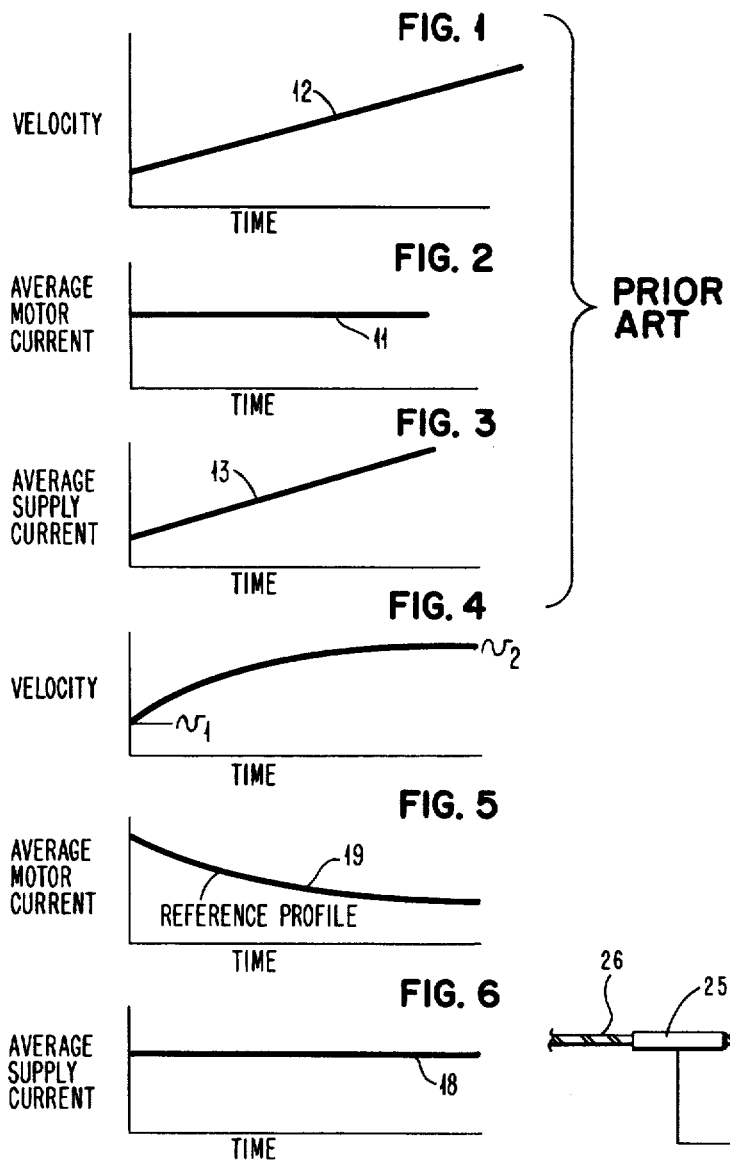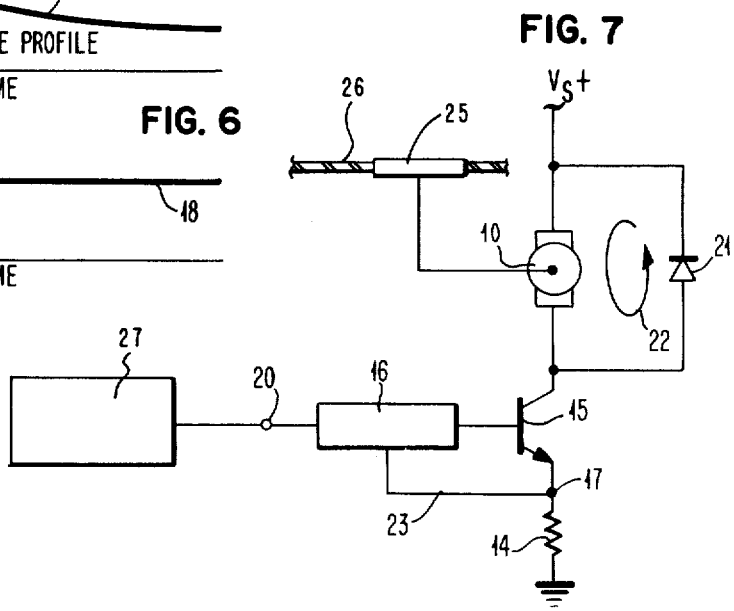

PRINTER ESCAPEMENT SERVOMOTOR DRIVE WITH A MINIMUM POWER SUPPLY

DESCRIPTION

BACKGROUND OF INVENTION

The present invention relates to motor drive circuits and particularly to servomotor drive circuits for driving the printhead escapement in printers such as various impact printers.

BACKGROUND ART

Servomotor drive circuits have long been a conventional means of driving the printhead escapement in a variety of impact as well as non-impact printers. Such printers include conventional daisy wheel hammer or missile printers as well as wire matrix printers in which the matrix of wires providing each character is mounted on a printhead carrier which is moved across the page through an escapement mechanism. The impact printer technology has over the years been a highly competitive one marked not only by printers of higher speed, i.e., throughput, but also—surprisingly, in this period of relatively high inflation—of reduced price. In order to keep prices low, the technology has been constantly seeking means for enhancing the throughput of printers without increasing their price. The present invention provides an expedient which accomplishes this.

In servomotor driven printer escapements, it was generally believed in the art that in order to increase printer escapement velocity, it was necessary to increase the capacity of power supplies, i.e., the average supply current which could be provided by the power supply at peak velocities. Since increase in capacities of power supplies is relatively expensive, there of course has been a fair amount of reluctance in the impact printer field toward increasing escapement velocities where such increased escapement velocities would require greater capacity power sources together with the attendant increase in printer cost.

The relationship of increased power supply needs with increased escapement velocity appears to have been based on the conventional prior art practice of maintaining a fixed or constant average motor current. This problem will be better understood with reference to FIGS. 1-3. FIG. 2 shows the conventional means of operating the servomotor wherein average motor current is shown as a factor of time. The average motor current curve 11 is level or fixed, i.e., the motor current does not change with time. In such conventional servomotor escapement drive circuits, it was not unusual to provide feedback circuits to control the average motor current so that it remained fixed. With such a constant or fixed average motor current, it was found that velocity curve 12, FIG. 1, varied directly with average supply current curve 13, FIG. 3. By average supply current is meant the average current which the power supply had to provide at any given point in time along curve 13. With such an arrangement if the velocity of the escapement, curve 12, were to be increased, then the required average supply current, curve 13, would also have to be increased. This would increase the maximum current which the power supply would have to provide and thereby increase capacity requirement for the power supply, i.e., the system would require a larger and more expensive power supply.

DISCLOSURE OF THE PRESENT INVENTION

The present invention provides a printer escapement drive circuit system wherein velocity and consequently throughput may be increased while minimizing and not significantly increasing power supply requirements. This is accomplished through the combination of a fixed power supply, i.e., the current source wherein the average current provided from the source is substantially constant. This fixed current source is applied to a servomotor which drives the escapement. Means are provided for controlling the current in the motor which comprise means for comparing a preselected varying current profile to the actual motor current during the escapement acceleration or deceleration. The actual motor current is sensed by sensing means, and the sensed current is fed back to the comparing means. The profile is selected so that the motor current varies inversely with escapement velocity, i.e., the motor current goes down as escapement velocity increases. The printer further includes a means responsive to the comparing means for altering the actual motor current to conform to said preselected profile. These current altering means may be conventional current chopper means which cut off the motor from the power or current source in order to decrease motor current whenever the actual current in the motor exceeds the level of the profile.

BRIEF DESCRIPTION OF THE DRAWING

Referring now to the drawing, wherein a preferred embodiment of the invention is illustrated, and wherein like reference numerals are used throughout to designate like parts:

FIG. 1 represents a time graph of the velocity of a typical prior art servomotor used in an escapement drive wherein velocity increases with time.

FIG. 2 is a timing graph showing the average motor current of this typical prior art motor.

FIG. 3 is a timing graph showing the average supply current required during the same time cycle for a typical prior art escapement servomotor.

FIG. 4 is a timing graph showing the change in velocity with time of a servomotor driven by the circuit of the present invention.

FIG. 5 is a timing graph showing the referenced profile being applied to the comparing means of the present invention.

FIG. 6 is a timing graph of the average supply current provided by the power source of the present invention.

FIG. 7 is a diagrammatic representation of the present invention as embodied in a simple servomotor drive circuit.

BEST MODE FOR CARRYING OUT THE INVENTION

Referring to FIG. 7, there will now be described a simple embodiment of the present invention. Servomotor 10 is used to drive the escapement 26 of a printer. The printer is suitably a wire matrix printer having a printhead 25 which is driven by escapement 26. The power source $V_s$ is applied to servomotor 10 through transistor 15 and resistor 14 to drive the motor 10. Transistor 15 is connected to ground through resistor 14. In order to control the motor current, i.e., the current through motor 10, transistor 15 together with chopper circuit 16 serves the function of chopping the current through the expedient of chopping, i.e., turning transistor 15 on and off to reduce current flow whenever the current level through motor 10 as sensed at node 17 exceeds a reference level in an operation to be hereinafter described in greater detail. In any event, chopper circuit 16 which performs a comparison function with respect to the current sensed at node 17 and a chopping function with respect to transistor 15 in response to this comparison function may be any conventional chopper circuit such as those described in U.S. Pat. Nos. 4,072,888 and 4,127,801 or as described in the *Sigma Stepping Motor Handbook* at pages 35 and 36.

In the operation of the present invention, the circuit shown in FIG. 7 will be operated in the following mode described with respect to the timing graph in FIGS. 4, 5 and 6. Let us assume that the escapement 26 has been at a relatively low initial velocity level, $v_1$, FIG. 4, and it is desired to move this velocity up to an operating velocity level, $v_2$. The desired acceleration curve is shown in FIG. 4. For convenience in description, let up assume that in the timing graphs of FIGS. 4–6, i.e., the time it takes to go from $v_1$ to $v_2$ in FIG. 4 is about 70 milliseconds. Contrary to the prior art as shown in FIG. 3 wherein the average supply current requirements increase with an increase in escapement velocity, the system of the present invention is arranged so that the average supply current 18 shown in supply current timing graph, FIG. 6, remains substantially constant or fixed. This constant supply current requirement is achieved by tailoring the average motor current 19 shown in FIG. 5 so that this current 19 will decrease with increasing escapement velocity rather than remaining fixed as in the prior art curve 11, FIG. 2.

In order to control the current through motor 10 and have its level conform with the predetermined profile of the average motor current 19, FIG. 5, which will produce the level supply current curve 18, FIG. 6, the voltage level at node 17 is sensed by chopper circuit 16 through line 23. Since the voltage level at node 17 is directly proportional to the current passing through resistor 14, the current through motor 10 may be sensed by sensing the voltage level at node 17 with transistor 15 on. Thus, in order to have the current through motor 10 conform with the profile 19 of FIG. 5, voltage level having the identical referenced profile which varies with time as shown in FIG. 5 is applied to terminal 20 of chopper circuit 16. The referenced profile which is to be applied to terminal 20 is a predetermined one which may be calculated based upon the parameters of the servomotor 10 to result in average supply current requirements, curve 18, FIG. 6, which are fairly constant.

The preselected referenced profile may be stored in a data processor 27 which may be any conventional microprocessor such as the Intel 8048 and output from this data processor to be applied to terminal 20 in the time sequence shown. As the referenced profile voltage level decreases with time as shown in FIG. 5, and the voltage level being sensed from node 17 remains high, i.e., above the profile level, then, chopper circuit 16 will reduce the effective off time of transistor 15. When transistor 15 is off, current will flow from the motor 10 through diode 21 back towards $V_s$ in a direction shown by arrow 22. The back e.m.f. voltage produced by motor 10 will act to lower the motor current and the corresponding voltage level sensed at node 17, with transistor 15 on, until it conforms to the reference profile which it is being compared to in chopper circuit 16. When the voltage level at node 17 reaches the reference level, then, control chopper circuit 16 will increase the effective on time of transistor 15 in a conventional chopper circuit manner until the voltage level at node 17 again fails to compare with the voltage profile being applied through terminal 20 to chopper circuit 16.

While the invention has been particularly shown and described with reference to a preferred embodiment it will be understood by those skilled in the art that various other changes in form and detail may be made without departing from the spirit and scope of the invention.

We claim:

1. In a printer having a printhead moved by an escapement, means for accelerating and decelerating the escapement comprising a fixed current source, a d.c. servomotor for driving said escapement means for applying the current from said source to said motor, and means for controlling the current in said motor comprising means for comparing a preselected varying motor current profile wherein the current varies inversely with escapement velocity to the actual motor current during escapement acceleration and deceleration, means for sensing said actual motor current, and means for feeding back said sensed current to said comparing means.

2. The printer of claim 1 wherein said current profile comprises an initially high current while the initial velocity of the escapement is relatively low said current profile decreasing to a relatively low current as said velocity increases.

3. The printer of claim 2 wherein said current profile is applied at the beginning of a print line to bring said escapement up to an operating velocity.

4. The printer of claim 3 wherein said printhead is a wire matrix printhead.

5. The printer of claims 1 or 4, further including means responsive to said comparing means for altering the actual motor current to conform to said preselected varying motor current profile.

6. The printer of claim 5 wherein said means for altering the motor current include a chopper circuit.

* * * * *